(12) United States Patent
Wang et al.

(10) Patent No.: US 11,988,321 B2
(45) Date of Patent: May 21, 2024

(54) HEIGHT-ADJUSTABLE STANDING POST

(71) Applicant: ZHEJIANG INTIAN HEALTH TECHNOLOGY CO., LTD., Ningbo (CN)

(72) Inventors: Peng Wang, Ningbo (CN); BiSheng Zheng, Ningbo (CN)

(73) Assignee: ZHEJIANG INTIAN HEALTH TECHNOLOGY CO., LTD., Ningbo (CN)

( * ) Notice: Subject to any disclaimer, the term of this patent is extended or adjusted under 35 U.S.C. 154(b) by 71 days.

(21) Appl. No.: 17/586,821

(22) Filed: Jan. 28, 2022

(65) Prior Publication Data

US 2023/0167941 A1 Jun. 1, 2023

(30) Foreign Application Priority Data

Nov. 29, 2021 (CN) .......................... 202122976581.0

(51) Int. Cl.
*F16M 11/04* (2006.01)
*F16M 11/22* (2006.01)

(52) U.S. Cl.
CPC .......... *F16M 11/22* (2013.01); *F16M 11/046* (2013.01)

(58) Field of Classification Search
CPC ............. F16M 11/046; F16M 2200/02; F16M 2200/00; F16M 2200/022; F16M 2200/025; F16M 2200/027; F16B 7/10; F16B 7/105; F16B 7/14; F16B 7/1418; F16B 7/1454; E04H 12/182
USPC ...... 248/145.6, 155.1, 161, 162.1, 404, 407, 248/408, 409, 410, 411, 157, 423, 121, 248/122.1, 123.11, 123.2, 125.1, 125.3, 248/125.8, 219.3, 219.4
See application file for complete search history.

(56) References Cited

U.S. PATENT DOCUMENTS

| | | | |
|---|---|---|---|
| 6,623,035 B1 * | 9/2003 | Schneider | B60S 9/04 254/419 |
| 7,806,381 B2 * | 10/2010 | Sisk Horne | E04G 25/061 403/109.1 |
| 8,020,828 B2 * | 9/2011 | Carnevali | F16M 11/28 248/407 |
| 8,960,104 B2 * | 2/2015 | Copeland | A47B 9/00 108/5 |

FOREIGN PATENT DOCUMENTS

CN 212233583 U 12/2020

* cited by examiner

*Primary Examiner* — Alfred J Wujciak
(74) *Attorney, Agent, or Firm* — Bayramoglu Law Offices LLC

(57) ABSTRACT

A height-adjustable standing post belongs to the technical field of height-adjustable devices. The height-adjustable standing post includes: a driving tube, an outer tube, a first fastener and a second fastener. The driving tube is supported on the ground. The outer tube is sleeved outside the driving tube, and the outer tube is allowed to rise and fall. The first fastener is provided between the driving tube and the outer tube, and the first fastener is fixed relative to a position of the driving tube. The second fastener is provided between the driving tube and the outer tube, and the second fastener is fixed relative to a position of the outer tube. The second fastener is provided with an auxiliary locking member, and the auxiliary locking member is used to manually lock the outer tube. The height-adjustable standing post has a wide height adjustment range, and is stable.

19 Claims, 6 Drawing Sheets

HEIGHT-ADJUSTABLE STANDING POST

CROSS REFERENCE TO THE RELATED APPLICATIONS

This application is based upon and claims priority to Chinese Patent Application No. 202122976581.0, filed on Nov. 29, 2021, the entire contents of which are incorporated herein by reference.

TECHNICAL FIELD

The present invention belongs to the technical field of height-adjustable devices, and more particularly, relates to a height-adjustable standing post.

BACKGROUND

Electric height-adjustable standing posts are widely used in household, medical and other fields. The prior electric height-adjustable standing posts generally include at least three layers of tube bodies from the inside to the outside, resulting in a complicated structure.

For example, the Chinese invention patent CN212233583U provides an anti-rotation structure for a height-adjustable table, and a round-tubular height-adjustable standing post. The round-tubular height-adjustable standing post includes an inner tube, an end cap and a driving tube. The inner tube is sleeved on one end of the driving tube. An end of the inner tube is clamped to the end cap. The driving tube passes through a limiting hole of the end cap, and the limiting hole is used for limiting the rotation of the driving tube. In this patent, the end cap is clamped with the inner tube to prevent the end cap from rotating, and the end cap prevents the driving tube from rotating by means of the limiting hole, such that the driving tube will not rotate relative to the inner tube. Compared with the prior anti-rotation structure, the structure in this patent has the advantages of simple structure, convenient processing and low cost. However, in this patent, since the length of the inner tube is short and the interval distance between the fastening points of the inner tube and the outer tube is short, the inner tube and the outer tube are prone to shake to make the height-adjustable standing post unstable, and the height adjustment range is narrow.

In the prior art, the height-adjustable standing posts are usually composed of a driving tube, an inner tube and an outer tube, and they have the problems that the inner tube and the outer tube are prone to shake to make the height-adjustable standing post unstable, and the height adjustment range is narrow.

SUMMARY

The present invention provides a height-adjustable standing post, which solves the problem that the inner and outer tubes of the height-adjustable standing post in the prior art are easily shaken to make the height-adjustable standing post unstable.

The concept of the present invention, a driving tube is supported on the ground; an outer tube is allowed to rise and fall; and a first fastener and a second fastener are arranged between the driving tube and the outer tube. This design simplifies the structure of the height-adjustable standing post, reduces the manufacturing cost, reduces the friction between the driving tube and the outer tube, and avoids the height-adjustable standing post from jamming when it is telescopic.

In another concept of the present invention, the second fastener is provided with an auxiliary locking mechanism. The auxiliary locking mechanism is used to manually lock the outer tube to prevent the outer tube from sliding down, so as to stabilize the height-adjustable standing post.

Further, in another concept of the present invention, the auxiliary locking member is provided with a strap and a first inclined surface, and the second fastener is provided with a second inclined surface corresponding to the first inclined surface. By pulling down the strap, the first inclined surface moves downward relative to the second inclined surface, such that the outer tube and the driving tube generate a large squeezing force on the second fastener, thereby preventing the outer tube from sliding down.

In another concept of the present invention, the first fastener is fixed on a top end of the driving tube, and the second fastener is fixed on the bottom end of the outer tube. There is a large gap between the first fastener and the second fastener, which widens the height adjustment range of the height-adjustable standing post. In addition, the outer tube and the driving tube are not easily shaken, thereby stabilizing the height-adjustable standing post.

Further, in another concept of the present invention, the first fastener and/or the second fastener are assembled through a detachable structure, which achieves simple and convenient assembly and disassembly.

In another concept of the present invention, the height-adjustable standing post is raised and lowered by a motor driving a screw rod, and the screw rod is connected to a transmission nut and a self-locking device. Under the action of the transmission nut, when the outer tube falls relative to the driving tube, the screw rod reverses. The self-locking device is used to prevent the screw rod from reverse rotation, so as to lock the height of the height-adjustable standing post, thereby effectively preventing the outer tube from sliding down when the motor is not working, so as to make the height-adjustable standing post stable and reliable.

The height-adjustable standing post provided by the present invention includes an outer tube and a driving tube. The outer tube is sleeved outside the driving tube, the driving tube is supported on the ground, and the outer tube and the driving tube are relatively telescopic. A first fastener and a second fastener are provided between an outer wall of the driving tube and an inner wall of the outer tube. The first fastener is provided above the second fastener. When the outer tube is raised and lowered, the second fastener is raised and lowered with the outer tube, and the first fastener is fixed on the driving tube with the same height. The first fastener and the second fastener serve as fastening points of the outer tube and the driving tube, which reduces the resistance between the inner wall of the outer tube and the outer wall of the driving tube when the outer tube is raised and lowered. In addition, the distance between the two fastening points (the first fastener and the second fastener) can be increased to increase the torque. In this way, the outer tube is less likely to shake relative to the driving tube, and the height adjustment range of the height-adjustable standing post is widened.

Further, the first fastener may be provided at a top end of the driving tube, and the second fastener may be provided at a tail end of the outer tube, which widens the height adjustment range of the height-adjustable standing post and stabilizes the height-adjustable standing post.

In addition, compared with the height-adjustable standing post provided with a driving tube, an inner tube and an outer tube from the inside to the outside in the prior art, the present invention omits the original inner tube, simplifies the structure of the height-adjustable standing post, and reduces the manufacturing cost.

Further, the height-adjustable standing post is provided with an auxiliary locking member. The auxiliary locking member is provided on the second fastener and is used to manually lock the outer tube to prevent the outer tube from sliding down, thereby stabilizing the height of a desktop.

In some embodiments, the auxiliary locking member is provided with a strap and a first inclined surface; the second fastener is provided with a second inclined surface corresponding to the first inclined surface, and a sliding groove and a through hole for limiting the auxiliary locking member; and the strap passes through the through hole and is exposed under the outer tube.

Further, the strap is provided with an oblique tooth; the second fastener is provided with a clamping tooth corresponding to the oblique teeth; and the oblique tooth is matched with the clamping tooth, such that the strap is only movable downward to be locked at a position.

Further, there may be multiple oblique teeth, and the strap may be locked at multiple positions. Therefore, the auxiliary locking member can stay at different positions of the sliding groove, such that the first inclined surface and the second inclined surface are in different abutment states.

Further, a gap is provided between the strap and the outer wall of the driving tube to facilitate the grabbing of the strap.

Preferably, when the strap is pulled downward, the second fastener is tightly coupled with the auxiliary locking member. A cross-sectional area of the second fastener and the auxiliary locking member on a horizontal plane is increased, such that the outer tube and the driving tube can generate a large squeezing force on the second fastener. When the outer tube slides down, a large friction force is generated, thereby preventing the outer tube from sliding down.

Further, the strap is provided with a protrusion, and the protrusion is used to increase the friction between the strap and a hand.

In some embodiments, the first fastener may also be provided with an auxiliary locking member based on the same principle.

In some embodiments, the first fastener is provided on the driving tube through a buckle structure, which is convenient for assembly and disassembly.

Further, the first fastener is provided with a first hook, and the driving tube is provided with a corresponding first clamping slot.

In some embodiments, the second fastener is provided on the outer tube through a buckle structure, which is simple and convenient for assembly and disassembly.

Further, the second fastener is provided with a second hook, and the outer tube is provided with a corresponding second clamping slot.

In some embodiments, the height-adjustable standing post is raised and lowered by a motor driving a screw rod, and the screw rod is connected to a transmission nut and a self-locking device. Under the action of the transmission nut, when the outer tube falls relative to the driving tube, the screw rod reverses. The self-locking device is used to prevent the screw rod from reverse rotation, thereby locking the height of the height-adjustable standing post, so as to effectively prevent the desktop from sliding down when the motor is not working, and make the height-adjustable standing post stable and reliable.

Further, the self-locking device includes a one-way bearing and an inside holder; the one-way bearing is sleeved outside the screw rod; and the inside holder is provided outside the one-way bearing.

Further, the one-way bearing includes an outer ring and an inner ring, and the inner ring is sleeved on the screw rod. When the screw rod rises relative to the driving tube, the screw rod rotates forward, the inner ring of the one-way bearing rotates with the screw rod, and the outer ring does not move. When the screw rod falls relative to the driving tube, the screw rod reverses, and the inner ring and the outer ring of the one-way bearing have the same movement tendency.

The inside holder is divided into two halves. After the clamping of the inside holder, frictional damping is generated with the outer ring of the one-way bearing to prevent the outer ring of the one-way bearing from rotating.

Further, the inside holder is provided with an end surface that abuts against the inner wall of the driving tube. The end surface is used to prevent the inside holder from rotating relative to the driving tube, so as to prevent the screw rod from reverse rotation. The self-locking device has a simple structure and a large self-locking force, which achieves the desirable load-bearing performance and high stability of the height-adjustable standing post and prevents the tabletop from sliding down.

Compared with the prior art, in the height-adjustable standing post provided by the present invention, the driving tube is supported on the ground, and the outer tube is sleeved outside the driving tube. The first fastener and the second fastener serve as the fastening points of the outer tube and the driving tube, which widens the height adjustment range, increases the torque, makes the outer tube and the driving tube less prone to shake, and stabilizes the height-adjustable standing post. The auxiliary locking member is provided to manually lock the outer tube so as to prevent the outer tube from sliding down and further stabilize the height-adjustable standing post.

BRIEF DESCRIPTION OF THE DRAWINGS

The present invention will be further described in detail below with reference to the drawings and preferred embodiments. However, those skilled in the art should understand that these drawings are drawn only for the purpose of explaining the preferred embodiments, and therefore should not be construed as a limitation to the scope of the present invention. In addition, unless otherwise specified, the drawings are only intended to conceptually represent the composition or configuration of the described objects and may include exaggerated displays, and the drawings are not necessarily drawn to scale.

Figure 1:
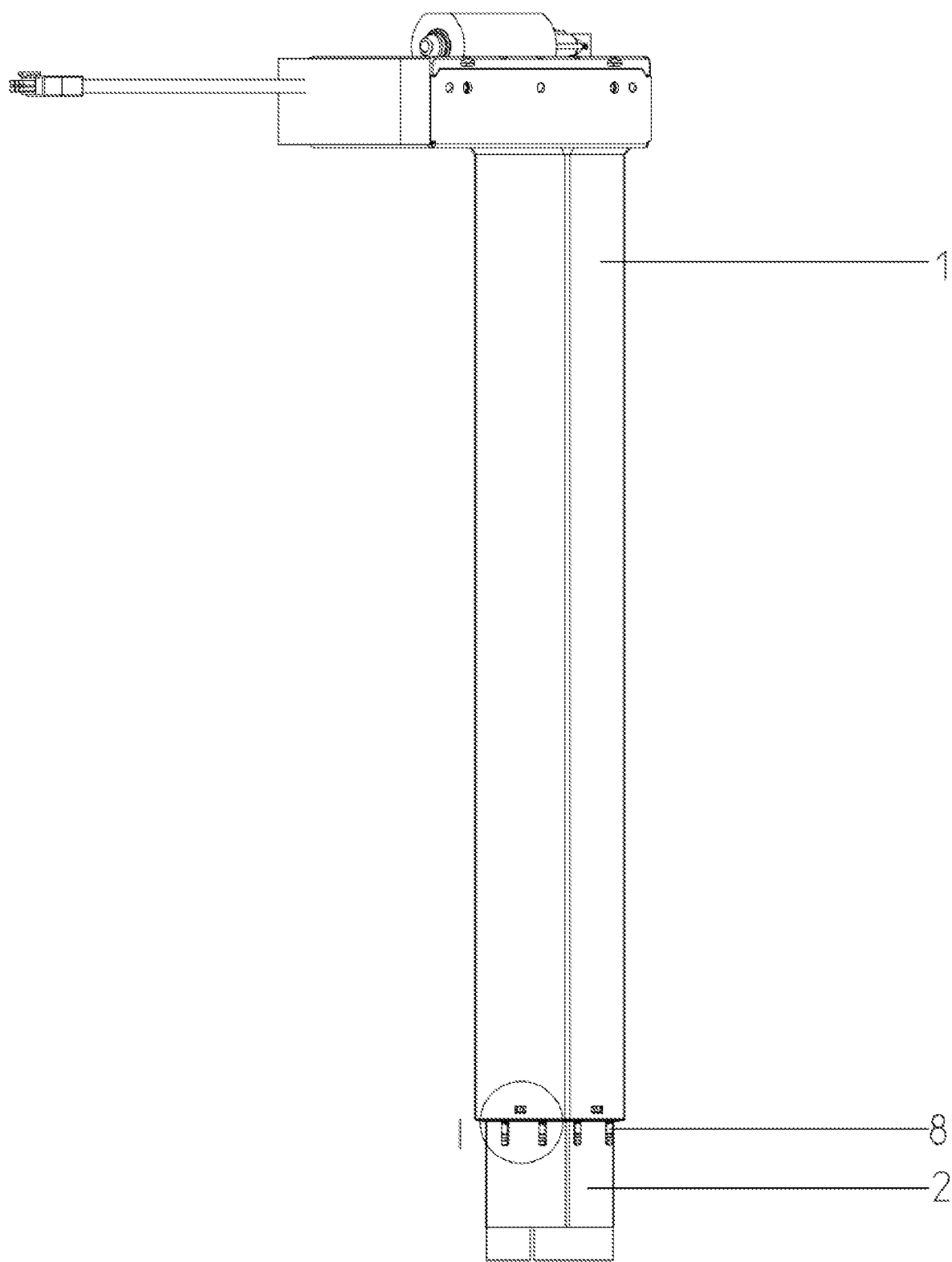
FIG. 1 is a lateral view of a height-adjustable standing post according to the present invention.
Figure 2:
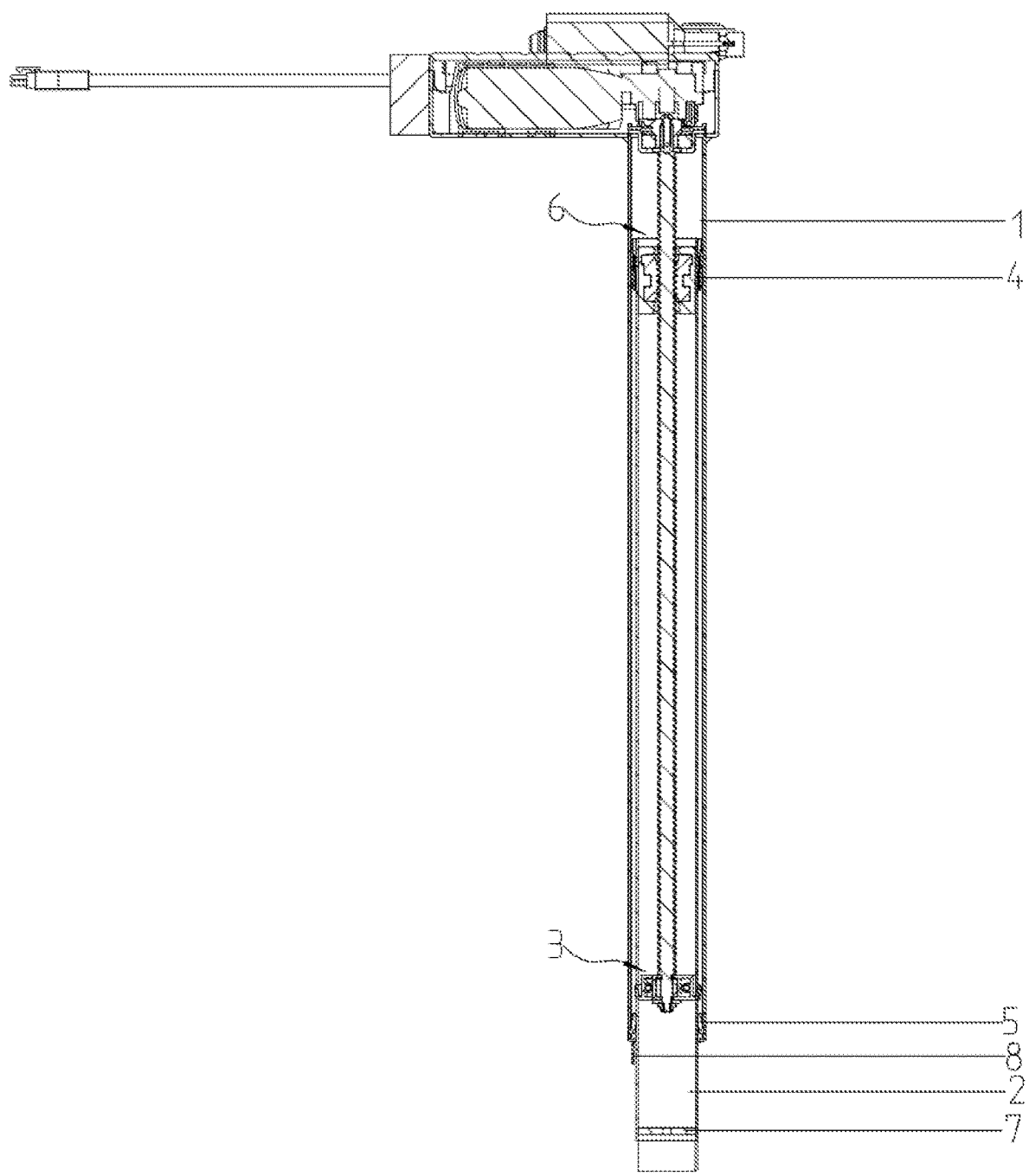
FIG. 2 is a sectional view of the height-adjustable standing post according to the present invention.
Figure 3:
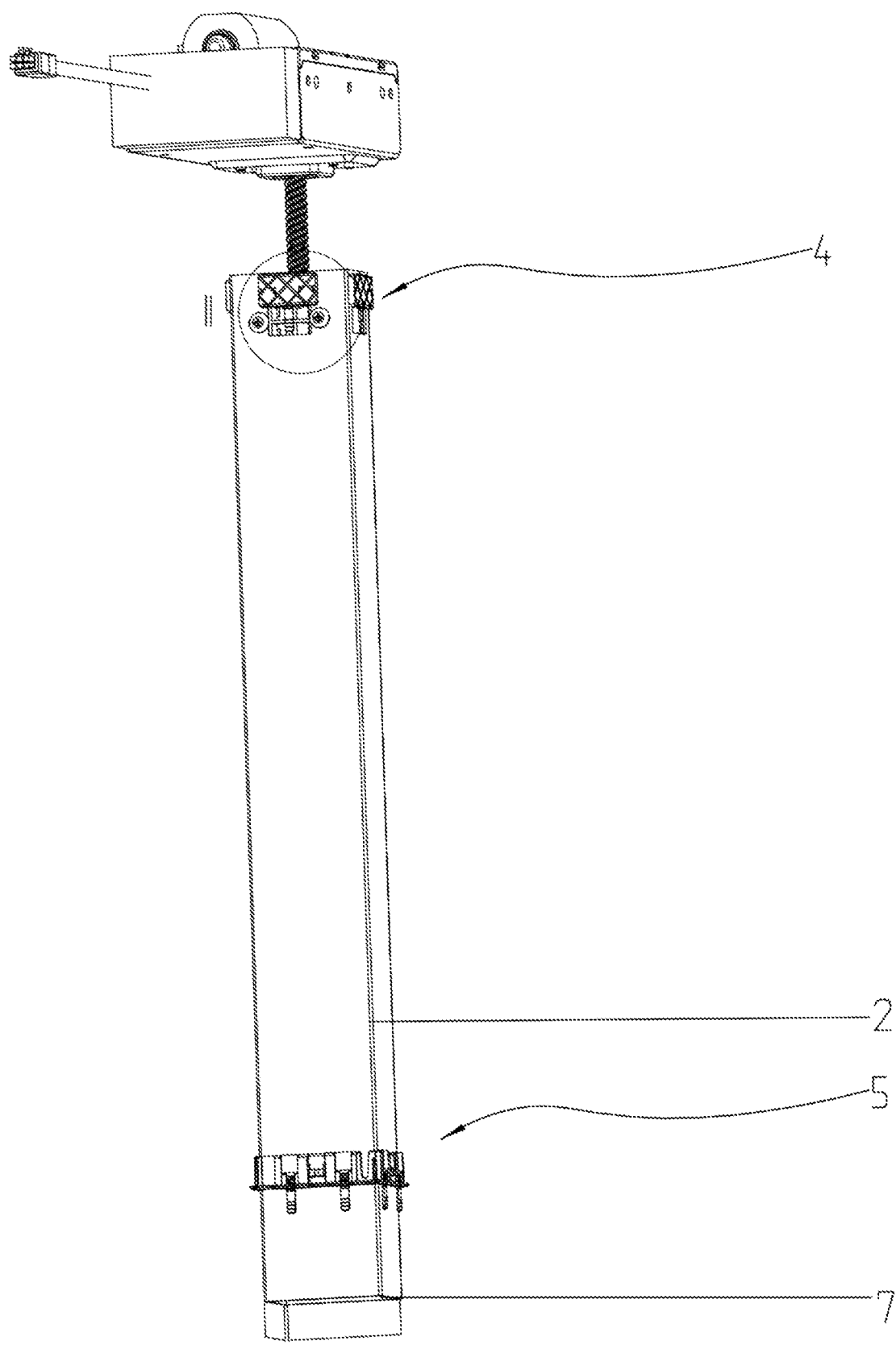
FIG. 3 is an interior view of the height-adjustable standing post according to the present invention.

REFERENCE NUMERALS 1. outer tube; 2. driving tube; 3. self-locking device; 4. first fastener; 5. second fastener; 6. transmission nut; 7. reinforcing plate; and 8. auxiliary locking member;
41. first hook; 51. second hook; 52. step; 53. second inclined surface; and 81. first inclined surface; and
31. inside holder; 31a. first holder; 31b. second holder; 311. end surface; 32. one-way bearing; 33. third fastener.

DETAILED DESCRIPTION OF THE EMBODIMENTS

The present invention will be explained in detail below with reference to the drawings.

In order to make the objectives, technical solutions and advantages of the present invention clearer, the present invention will be further described in detail below with reference to the drawings and embodiments. It should be understood that the specific embodiments described herein are merely intended to explain the present invention, rather than to limit the present invention.

Embodiment 1: The present invention provides a height-adjustable standing post. The height-adjustable standing post includes an outer tube 1 and a driving tube 2. The driving tube 2 is supported on the ground, and the outer tube 1 is sleeved outside the driving tube 2. A first fastener 4 and a second fastener 5 are provided between the driving tube 2 and the outer tube 1. The first fastener 4 is provided above the second fastener 5. When the outer tube 1 moves up and down relative to the driving tube 2, the second fastener 5 rises and falls with the outer tube 1, but the position of the first fastener 4 remains unchanged. Due to the design of the first fastener 4 and the second fastener 5, a gap is provided between the outer tube 1 and the driving tube 2. Compared with the conventional structure in which the inner tube and the outer tube abut through their tube walls, the present invention reduces the resistance of the outer tube 1 to rise and fall. In addition, due to the large gap between the first fastener 4 and the second fastener 5, the height adjustment range of the height-adjustable standing post is wider, the outer tube 1 and the driving tube 2 are not easily shaken, and the height-adjustable standing post is more stable. Compared with the prior art, the present invention omits an original inner tube, which simplifies the structure of the height-adjustable standing post, and reduces the manufacturing cost.

The height-adjustable standing post is provided with an auxiliary locking member 8, and the auxiliary locking member 8 is provided on the second fastener 5.

Figure 4:
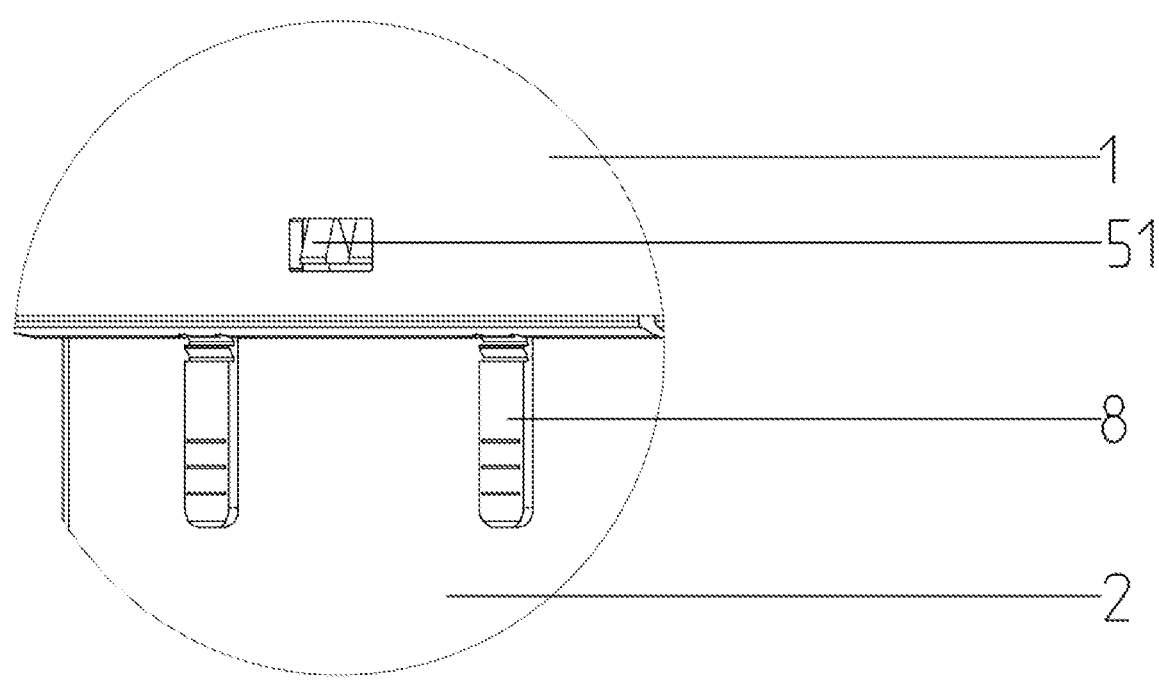
FIG. 4 is a detail view of a part shown in FIG. 1.

As shown in FIG. 4, the auxiliary locking member 8 is provided on the second fastener 5. The auxiliary locking member 8 is provided with a strap that is convenient for applying a force by a hand and is exposed under the outer tube 1. When a desktop is adjusted to a desired height, pulling the strap downward can increase the sliding friction between the outer tube 1 and the driving tube 2, thereby locking the outer tube and preventing the outer tube from sliding down.

Figure 5:
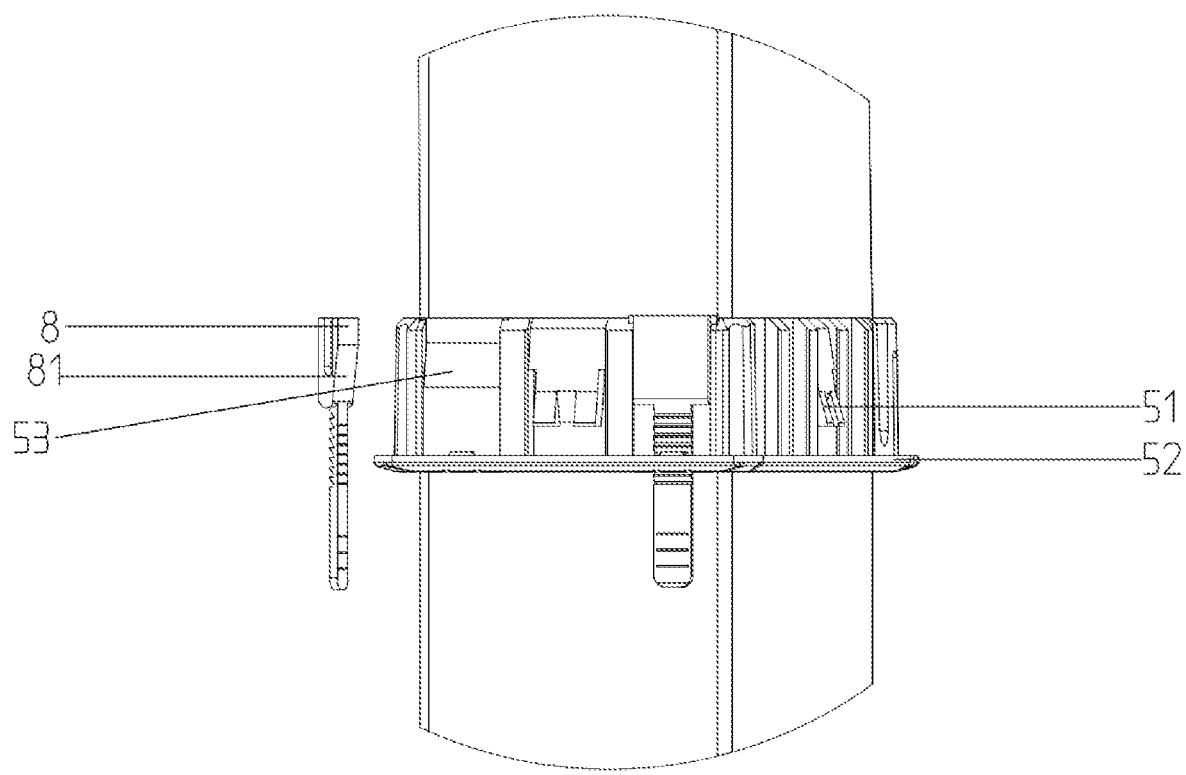
FIG. 5 is a detail view of a part shown in FIG. 3.

Specifically, as shown in FIG. 5, the auxiliary locking member 8 is provided with a first inclined surface 81. Due to the first inclined surface 81, the auxiliary locking member 8 is thicker on an upper side and thinner on a lower side. The second fastener 5 is provided with a second inclined surface 53 matched with the first inclined surface 81. When the strap is pulled downward, the first inclined surface 81 slides down relative to the second inclined surface 53, such that the second fastener 5 and the auxiliary locking member 8 are tightly coupled. The cross-sectional area of the second fastener and the auxiliary locking member on the horizontal plane is increased to generate a large squeezing force on the outer tube 1 and the driving tube 2, such that the outer tube receives large frictional damping when it slides down. The auxiliary locking member 8 can effectively lock the outer tube to prevent the outer tube from sliding down, and it has a simple structure and convenient operation.

Further, the strap is provided with multiple oblique teeth. The second fastener 5 is provided with clamping teeth corresponding to the oblique teeth. The oblique teeth are matched with the clamping teeth, such that the strap is only movable downward to be locked at multiple positions. The auxiliary locking member 8 can stay at different positions of a sliding groove, such that the first inclined surface and the second inclined surface are in different abutment states.

Further, a gap is provided between the strap and an outer wall of the driving tube 2 to facilitate the grabbing of the strap.

Preferably, when the strap is pulled downward, the second fastener 5 is tightly coupled with the auxiliary locking member 8. The cross-sectional area of the second fastener and the auxiliary locking member on the horizontal plane is increased, such that the outer tube 1 and the driving tube 2 generate a large squeezing force on the second fastener 5. When the outer tube 1 slides down, a large friction force is generated, thereby preventing the outer tube from sliding down.

Further, the strap is provided with a protrusion, and the protrusion is used to increase the friction between the strap and a hand.

In other embodiments, the first fastener 4 may also be provided with an auxiliary locking member based on the same principle.

Embodiment 2: Based on Embodiment 1, the present invention may further limit the mounting methods and specific structures of the first fastener 4 and the second fastener 5. The first fastener 4 is provided at a top end of the driving tube 2, and the second fastener 5 is provided at a tail end of the outer tube 1. There is a large gap between the first fastener 4 and the second fastener 5, thereby widening the height adjustment range of the height-adjustable standing post. In addition, due to the large torque between the two fastening points, the outer tube 1 and the driving tube 2 are not easily shaken, thereby stabilizing the height-adjustable standing post.

Further, the first fastener 4 and the second fastener 5 are assembled through a detachable structure. The detachable structure includes buckle connection and threaded connection, which achieves simple and convenient assembly and disassembly.

Figure 7:
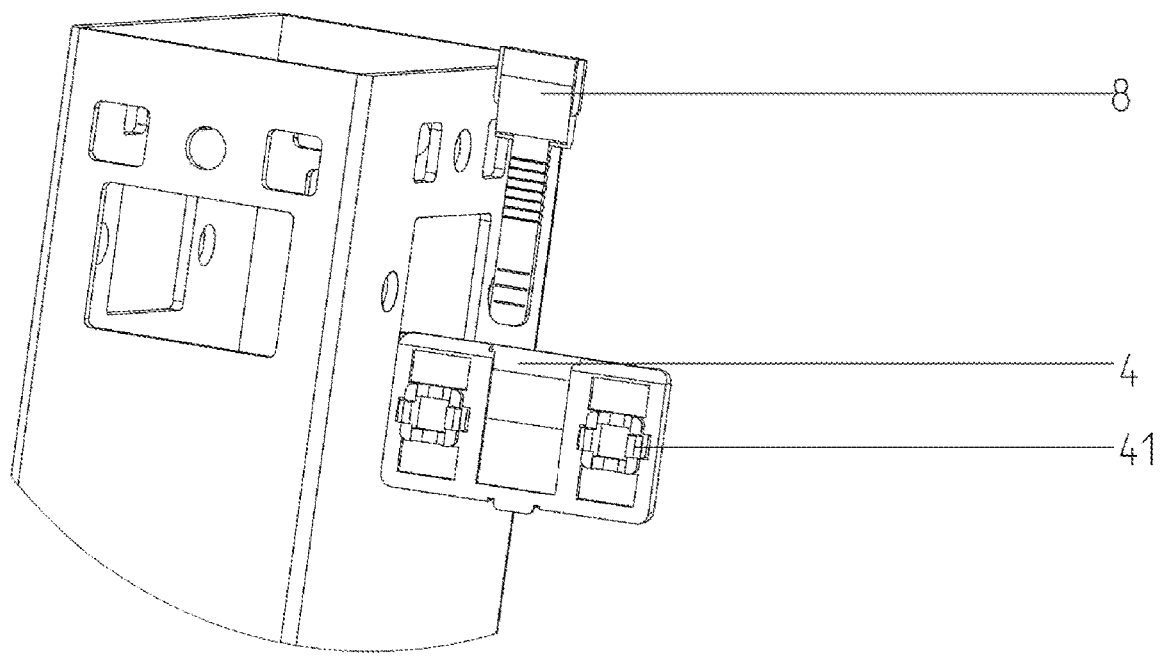
FIG. 7 is a structural view of the first fastener according to the present invention.

As shown in FIG. 7, the first fastener 4 may be provided on the driving tube 2 through a buckle structure, which is convenient for assembly and disassembly.

The first fastener 4 is provided with a first hook 41, and the driving tube 2 is provided with a corresponding first clamping slot.

The first fastener 4 is provided with a non-slip protrusion. The non-slip protrusion is grid-shaped and used to increase the friction with an inner wall of the outer tube 1.

As shown in FIGS. 4 and 5, the second fastener 5 may be provided on the outer tube 1 through a buckle structure, which is simple and convenient for assembly and disassembly.

The second fastener 5 is provided with a second hook 51, and the outer tube 1 is provided with a corresponding second clamping slot.

In a natural state, the second hook is warped outward, such that the hook can be locked into the second clamping slot by itself.

A top of the second fastener 5 is provided with a chamfer, which is easy to clamp the outer tube 1 into the second fastener 5 from top to bottom.

The second fastener 5 is provided with a step 52 for bearing and limiting the outer tube 1.

Compared with the prior art, the height-adjustable standing post provided by the present invention has a wider height adjustment range, the outer tube 1 and the driving tube 2 are not easily shaken, and the height-adjustable standing post is more stable.

Embodiment 3: Based on the above embodiment, the present invention further provides a driving mechanism for the height-adjustable standing post. The height-adjustable standing post is raised and lowered by a motor driving a screw rod. The screw rod is connected to a transmission nut 6 and a self-locking device 3.

Figure 6:
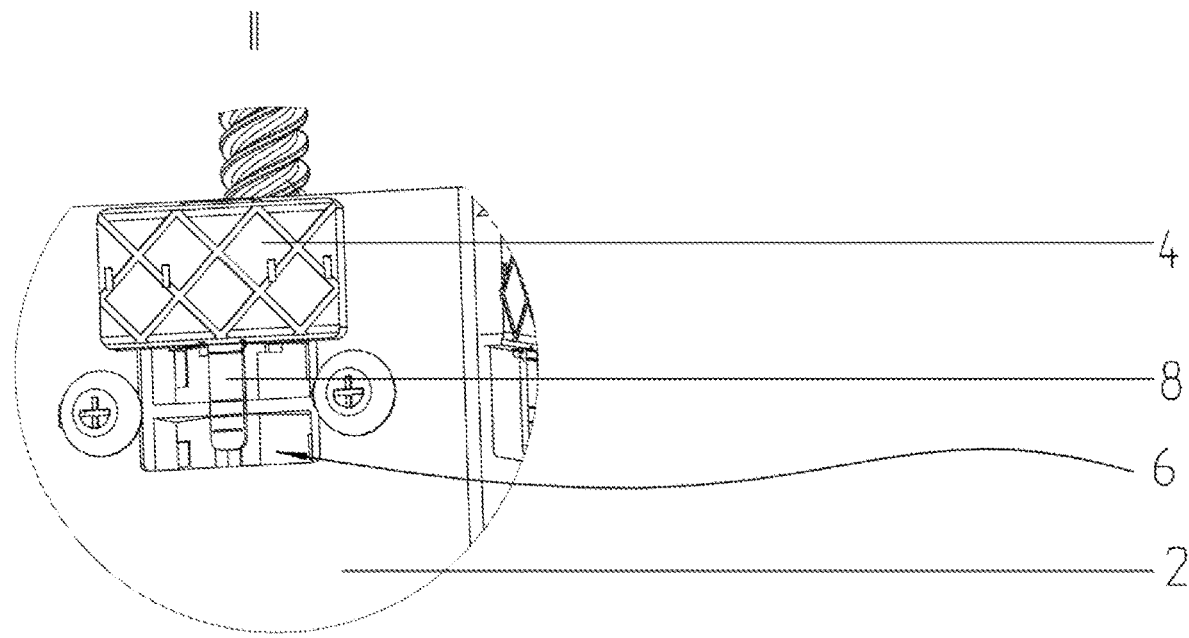
FIG. 6 is an assembly view of a first fastener according to the present invention.
Figure 9:
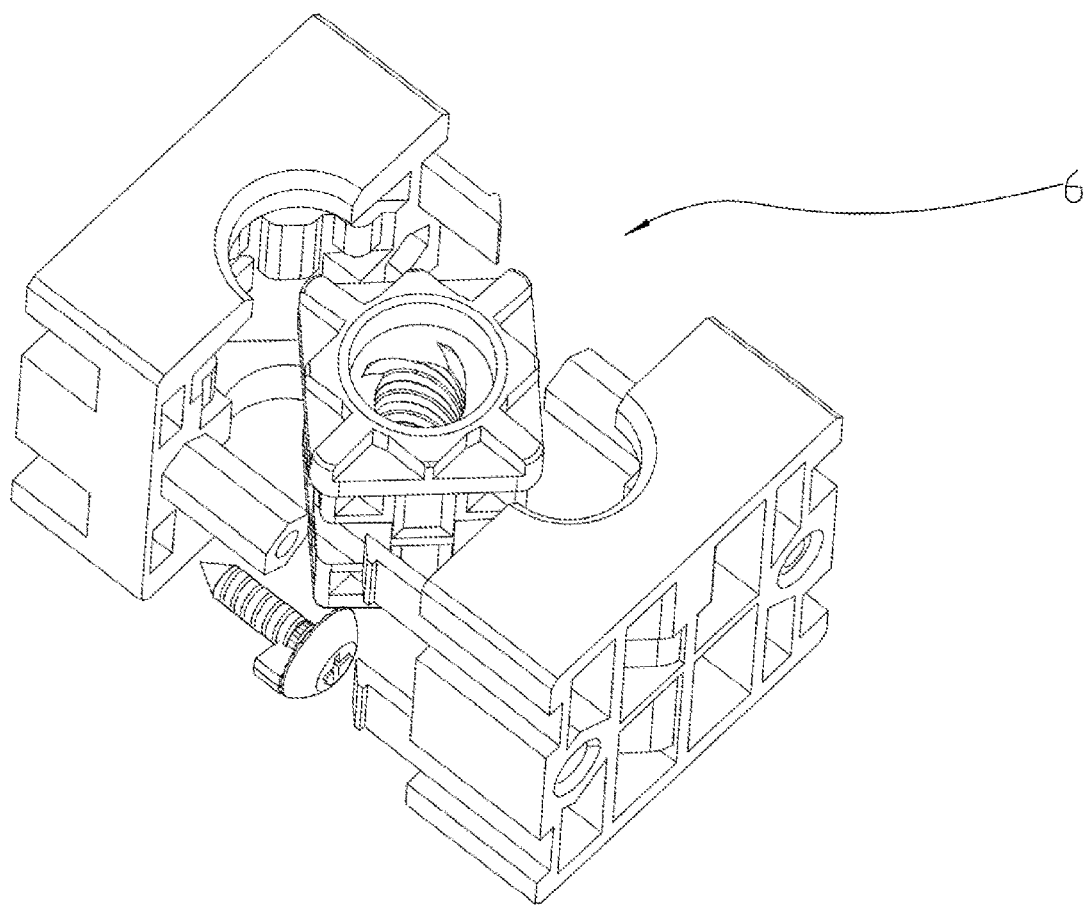
FIG. 9 is a structural view of a transmission nut according to the present invention.

As shown in FIGS. 6 and 9, the transmission nut 6 is fixed to a top end of the driving tube 2 by a bolt. The transmission nut 6 includes an inner core and an outer shell. The inner core is provided with an internal thread engaged with the screw rod, and the outer shell is provided on the driving tube 2 through a bolt structure. The transmission nut 6 cannot be displaced relative to the driving tube 2.

Figure 8:
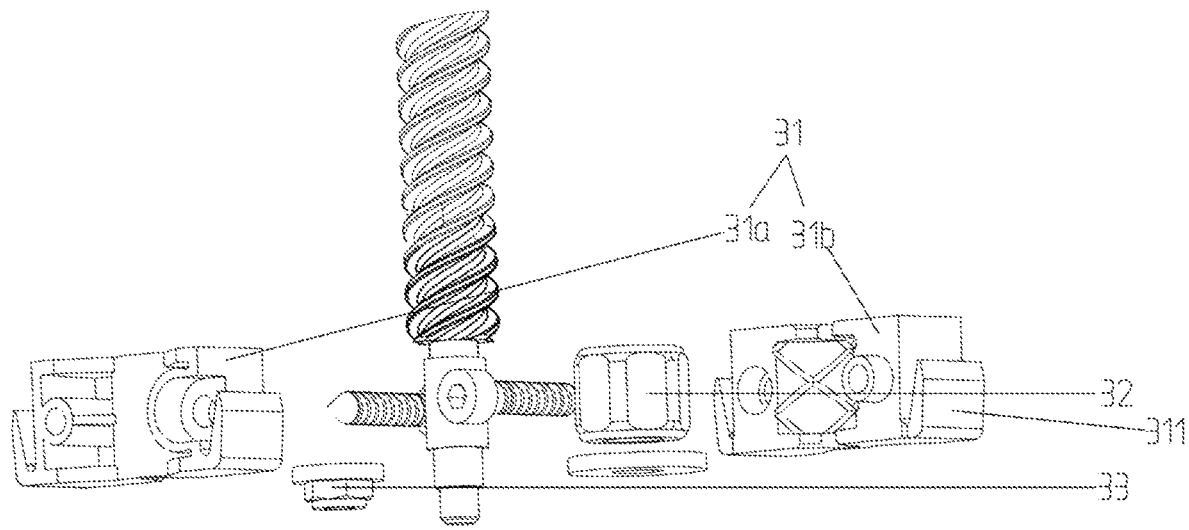
FIG. 8 is a structural view of a self-locking device according to the present invention.

As shown in FIG. 8, the self-locking device 3 includes a one-way bearing 32 and an inside holder 31. The one-way bearing 32 is sleeved outside the screw rod, and the inside holder 31 is provided outside the one-way bearing 32.

The self-locking device 3 is provided at a tail end of the screw rod, and the self-locking device 3 is fixed at the tail end of the screw rod by a third fastener 33.

The one-way bearing 32 includes an outer ring and an inner ring, and the inner ring is sleeved on the screw rod. When the screw rod rises relative to the driving tube 2, the screw rod rotates forward, the inner ring of the one-way bearing 32 rotates with the screw rod, and the outer ring does not move. When the screw rod falls relative to the driving tube 2, the screw rod reverses, and the inner ring and the outer ring of the one-way bearing 32 have the same movement tendency.

The inside holder 31 is divided into two halves, including a first holder 31a and a second holder 31b. After the clamping of the inside holder 31, frictional damping is generated with the outer ring of the one-way bearing 32 to prevent the outer ring of the one-way bearing 32 from rotating relative to the inside holder 31.

The inside holder 31 can be provided in a left-to-right split type or a top-to-bottom split type, and the first holder 31a and the second holder 31b are fastened and connected by a threaded structure.

Further, the inside holder 31 is provided with an end surface 311 that abuts against the inner wall of the driving tube 2. The end surface 311 is used to prevent the inside holder 31 from rotating relative to the driving tube 2 so as to prevent the screw rod from reverse rotation. The self-locking device 3 has a simple structure and a large self-locking force, which achieves the desirable load-bearing performance and high stability of the height-adjustable standing post and prevents the tabletop from sliding down.

The inside holder 31 is provided with a non-slip surface, and the non-slip surface is used to increase the friction with the one-way bearing 32 so as to prevent slipping.

When the outer tube 1 falls relative to the driving tube 2, the screw rod reverses. The self-locking device 3 is used to prevent the screw rod from reverse rotation, thereby locking the height of the height-adjustable standing post, so as to effectively prevent the desktop from sliding down when the motor is not working, and make the height-adjustable standing post stable and reliable.

Further, the driving tube 2 is provided with a reinforcing plate 7. The reinforcing plate 7 is provided inside the driving tube 2 to prevent the driving tube 2 from being deformed and increase the stability of the driving tube 2.

The present invention is described in detail above. Specific cases are used herein to illustrate the principle and implementation of the present invention, and the description of the above embodiments is only intended to help understand the core idea of the present invention. It should be noted that improvements and modifications may be made by those of ordinary skill in the art without departing from the principle of the present invention, and these improvements and modifications should also fall within the protection scope of the present invention.

What is claimed is:

1. A height-adjustable standing post, comprising:
    a driving tube, wherein the driving tube is supported on ground;
    an outer tube, wherein the outer tube is sleeved outside the driving tube, and the outer tube is allowed to rise and fall;
    a first fastener, wherein the first fastener is provided between the driving tube and the outer tube, and the first fastener is fixed relative to a position of the driving tube; and
    a second fastener, wherein the second fastener is provided between the driving tube and the outer tube, and the second fastener is fixed relative to a position of the outer tube;
    wherein, the second fastener is provided with an auxiliary locking member, and the auxiliary locking member is used to manually lock the outer tube;
    wherein the first fastener is provided with a first hook, and the driving tube is provided with a first clamping slot corresponding to the first hook; and
    wherein the second fastener is provided with a second hook, and the outer tube is provided with a second clamping slot corresponding to the second hook.

2. The height-adjustable standing post according to claim 1, wherein
    the auxiliary locking member is provided with a strap and a first inclined surface;
    the second fastener is provided with a second inclined surface, a sliding groove and a through hole, wherein the second inclined surface corresponds to the first inclined surface, and the sliding groove and the through hole are configured for limiting the auxiliary locking member; and
    the strap passes through the through hole and is exposed outside the outer tube.

3. The height-adjustable standing post according to claim 2, wherein
    the strap is provided with at least one oblique tooth;
    the second fastener is provided with a clamping tooth corresponding to the at least one oblique tooth; and the at least one oblique tooth is matched with the clamping tooth to lock the strap at a position.

4. The height-adjustable standing post according to claim 3, wherein
the strap is provided with a protrusion, and the protrusion is used to increase a friction between the strap and a hand.

5. The height-adjustable standing post according to claim 1, wherein
a top end of the second fastener is provided with a chamfer;
the second fastener is further provided with a step; and
the step is in contact with a bottom surface of the outer tube to limit the outer tube.

6. The height-adjustable standing post according to claim 1, wherein
the first fastener is provided at a top end of the driving tube.

7. The height-adjustable standing post according to claim 1, wherein
the first fastener is further provided with an auxiliary locking member.

8. The height-adjustable standing post according to claim 1, further comprising a motor and a screw rod; wherein
the screw rod is connected to a transmission nut and a self-locking device; and
the self-locking device is matched with the transmission nut to prevent the screw rod from reverse rotation.

9. The height-adjustable standing post according to claim 8, wherein
the self-locking device comprises a one-way bearing and an inside holder;
the one-way bearing is sleeved outside the screw rod, and the inside holder is provided outside the one-way bearing; and
the inside holder is provided with an end surface, wherein the end surface abuts against an inner wall of the driving tube.

10. A height-adjustable standing post, comprising:
a driving tube, wherein the driving tube is supported on ground;
an outer tube, wherein the outer tube is sleeved outside the driving tube, and the outer tube is allowed to rise and fall;
a first fastener, wherein the first fastener is provided between the driving tube and the outer tube, and the first fastener is fixed relative to a position of the driving tube; and
a second fastener, wherein the second fastener is provided between the driving tube and the outer tube, and the second fastener is fixed relative to a position of the outer tube;
wherein, the second fastener is provided with an auxiliary locking member, and the auxiliary locking member is used to manually lock the outer tube;
wherein
the auxiliary locking member is provided with a strap and a first inclined surface;
the second fastener is provided with a second inclined surface, a sliding groove and a through hole, wherein the second inclined surface corresponds to the first inclined surface, and the sliding groove and the through hole are configured for limiting the auxiliary locking member; and
the strap passes through the through hole and is exposed outside the outer tube.

11. The height-adjustable standing post according to claim 10, wherein
the strap is provided with at least one oblique tooth;
the second fastener is provided with a clamping tooth corresponding to the at least one oblique tooth; and
the at least one oblique tooth is matched with the clamping tooth to lock the strap at a position.

12. The height-adjustable standing post according to claim 11, wherein
the strap is provided with a protrusion, and the protrusion is used to increase a friction between the strap and a hand.

13. The height-adjustable standing post according to claim 10, wherein
a top end of the second fastener is provided with a chamfer;
the second fastener is further provided with a step; and
the step is in contact with a bottom surface of the outer tube to limit the outer tube.

14. The height-adjustable standing post according to claim 10, wherein
the first fastener is provided at a top end of the driving tube.

15. The height-adjustable standing post according to claim 10, wherein the second fastener is provided at a tail end of the outer tube.

16. A height-adjustable standing post, comprising:
a driving tube, wherein the driving tube is supported on ground;
an outer tube, wherein the outer tube is sleeved outside the driving tube, and the outer tube is allowed to rise and fall;
a first fastener, wherein the first fastener is provided between the driving tube and the outer tube, and the first fastener is fixed relative to a position of the driving tube; and
a second fastener, wherein the second fastener is provided between the driving tube and the outer tube, and the second fastener is fixed relative to a position of the outer tube;
wherein, the second fastener is provided with an auxiliary locking member, and the auxiliary locking member is used to manually lock the outer tube; and
further comprising a motor and a screw rod; wherein
the screw rod is connected to a transmission nut and a self-locking device; and
the self-locking device is matched with the transmission nut to prevent the screw rod from reverse rotation.

17. The height-adjustable standing post according to claim 16,
wherein the self-locking device comprises a one-way bearing and an inside holder.

18. The height-adjustable standing post according to claim 17,
wherein the one-way bearing is sleeved outside the screw rod, and the inside holder is provided outside the one-way bearing.

19. The height-adjustable standing post according to claim 18,
wherein the inside holder is provided with an end surface, and
wherein the end surface abuts against an inner wall of the driving tube.

* * * * *